Feb. 18, 1969

P. J. BODDY ET AL 3,428,811

OPTICAL MODULATION BY REFLECTION FROM
A FERROELECTRIC SEMICONDUCTOR
Filed March 21, 1966

INVENTORS P. J. BODDY
A. F. FROVA
BY
Arthur J. Torsiglieri
ATTORNEY

United States Patent Office 3,428,811
Patented Feb. 18, 1969

3,428,811
OPTICAL MODULATION BY REFLECTION FROM A FERROELECTRIC SEMICONDUCTOR
Philip J. Boddy, Short Hills, and Andrea F. Frova, North Plainfield, N.J., assignors to Bell Telephone Laboratories, Incorporated, New York, N.Y., a corporation of New York
Filed Mar. 21, 1966, Ser. No. 536,033
U.S. Cl. 250—199        10 Claims
Int. Cl. H04b 9/00

ABSTRACT OF THE DISCLOSURE

An optical modulator in which light to be modulated is made incident on the surface of a ferroelectric semiconducting crystal, such as potassium tantalate and a surface rectifying barrier is provided at such surface. Modulation is achieved in the light reflected from such surface by modulating the electric field associated with the rectifying barrier.

---

Figure 1:
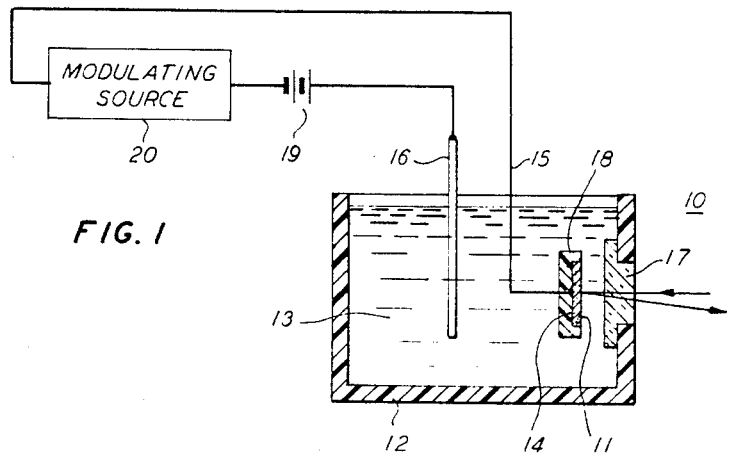

This invention relates to the modulation of an optical beam in accordance with modulating information.

Currently, considerable effort is being expended on the development of an optical communication system because of the known advantages of such a system. Important to such a system is the efficient modulation of the optical beam, which serves as the carrier in accordance with the information to be transmitted. Although various modulation techniques have been proposed hitherto, each suffers from one or more faults and no completely satisfactory technique has yet been developed. Common failings of known modulation techniques include the low index of modulation readily attainable, the large amount of modulating energy needed, and the large amount of optical energy wastefully absorbed.

An object of this invention is a modulator which is efficient in these regards.

In accordance with the present invention, the light to be modulated is reflected from an appropriate crystal which is characterized by a region of high electric field, and the modulating intelligence is used to vary the strength of the electric field whereby the amount of light reflected is varied correspondingly. In particular, the crystal is taken from the group of ferroelectric semiconducting crystals and the incident light is chosen to have photon energies larger than the forbidden energy band or gap characteristic of the crystal.

A feature of a preferred embodiment of the invention is a ferroelectric semiconducting crystal which is provided with a rectifying surface barrier on one face where the optical beam to be modulated is made incident. It has been found that the reflectance of the beam from such a face is highly sensitive to the electric field in the space charge layer associated with such surface barrier. For modulation, a voltage is established across such surface barrier, and this voltage is varied in accordance with the modulating information whereby the intensity of the reflected energy varies accordingly and a modulated beam results.

The use of a rectifying surface barrier makes it possible to realize in the crystal a localized region of electric field of the desired high intensity with convenient values of applied voltages. In principle, by the application of voltages of sufficient intensity, it should be feasible to employ a substantially homogeneous crystal.

While priorly attempts have been made to utilize reflectance changes for the modulation of optical waves, such attempts have not involved the use of a ferroelectric semiconductor as the reflecting medium, and as a consequence the maximum degree of modulation which has been achieved with practical operating characteristics typically has been less than one percent. By way of contrast the present invention has provided amounts of reflection in excess of twenty-five percent with practical operating conditions.

In an illustrative embodiment of the invention, a crystal of potassium tantalate was positioned in an electrolytic solution to have one face exposed to it and was biased in the reverse direction with respect to it. This created a rectifying surface barrier at the face where the crystal was in contact with the solution. The beam of light to be modulated was directed at this surface at nearly normal incidence for reflection therefrom. The modulating information in voltage form was impressed on the voltage biasing the crystal. As a consequence, the reflected beam was intensity modulated in accordance with the modulating information.

In particular, in an embodiment of this kind it has been possible to achieve readily modulation in excess of twenty-five percent with reflectance efficiencies of about thirty percent with voltage modulation of about fifty volts.

Figure 2:
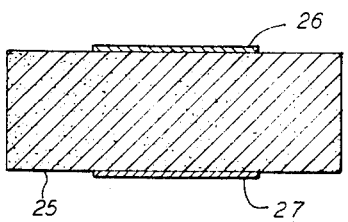
Figure 3:

The invention will be better understood from the following more detailed description taken with the accompanying drawing in which:

FIGS. 1 and 2 show schematically different illustrative embodiments of the invention; and FIG. 3 shows an arrangement for achieving multiple reflections for increasing the index of reflection.

With reference now to FIG. 1, the modulator 10 comprises an n-type crystal of potassium tantalate 11 shown positioned in a cell 12 and immersed in an electrolytic solution 13 included in the cell. The crystal is insulated from the electrolyte over its surface except for exposed surface 11A. An ohmic connection 14 is made to the bulk of the crystal and a lead 15 therefrom passes out of the cell insulated from the electrolyte. An electrode 16 is provided to the electrolyte whereby a voltage can be applied between the electrolyte and the crystal. The crystal is positioned within the cell close by a window 17 provided therein through which a light beam can be passed for incidence on and reflection from the exposed face of the crystal.

The electrolyte is chosen to be transparent to the light beam to be modulated and also to form a suitable rectifying surface barrier with the crystal. A satisfactory aqueous electrolyte has been a neutral potassium phosphate buffer although electrolytes generally have the property of forming rectifying surface barriers with semiconducting crystals and so could be used.

The ohmic contact 14 to the crystal advantageously is an evaporated layer of chromium, although aluminum and titanium also are suitable. The ohmic contact and the bulk of the crystal can be insulated from the electrolyte, for example, by an epoxy encasement 18.

The light to be modulated is provided from a suitable source, and is made to impinge on the exposed crystal face. For practical reasons, it is found advantageous to have the angle of incidence about 4° from the normal. Smaller angles of incidence tend to make difficult the separation of incident and reflected beams and increased angles tend to increase the illuminated area of the crystal.

The light beam to be modulated should be of wavelengths which are not transmitted freely through the crystal. The absorption phenomenon that appears to be primarily responsible for the change in reflectance is fundamental band to band optical transitions. To this end the photon energies should be larger than the width of the forbidden energy band or gap characteristic of the crystal. In the case of potassium tantalate which has an energy gap of about 3.5 electron volts, the photon energies required for the light beam correspond to wavelengths less than about 3540 Angstrom units. Presently available sources providing light with photon energies in this range include Xenon discharge lamps, which provide incoherent light. For coherent light, the output of an argon ion laser can be supplied to a harmonic generator for frequency doubling in known fashion.

It is unnecessary that the incident light beam to be modulated be of high intensity. It has been found possible to achieve a high index of modulation of incident beams of microwatt intensity in a spot 2 millimeters by ½ millimeter. The principal limitation on the intensity of the beam stems from the usual need to avoid overheating.

The modulating information is used to modulate the voltage applied between the ohmic contact 14 and the electrode 16, which control respectively the potential of the bulk of the crystal and the potential of the electrolyte. Since it is important both to avoid charge carrier injection at the rectifying surface barrier and to establish a high electric field, typically of the order of $10^6$ volts/cm., in the space charge layer associated with the rectifying surface barrier formed between the crystal and the electrolyte, there is established a voltage bias between contact 14 and electrode 16 by means of D-C voltage source 19. In particular, the contact 14 is maintained positive with respect to electrode 16 to achieve a reverse bias across the rectifying surface barrier.

Serially connected with voltage source 19 is a varying voltage source 20 whose variations correspond to the modulating information. As previously indicated, the amplitude of the voltage variations should not be such as to result in a forward bias across the rectifying surface barrier. Additionally, precautions should be taken to avoid reverse biases so long that breakdown occurs at the rectifying surface barrier.

In one specific form of the embodiment being described, the n-type crystal had a concentration of about $2 \times 10^{18}$ donor centers per cubic centimeter achieved by doping with calcium the melt from which the crystal was grown, in known fashion. It was found that the lower the doping level the less sensitive the reflectance characteristic, i.e. the lower the doping level the greater the voltage difference needed to achieve a desired change in reflectance. For potassium tantalate, a lower limit was found to be about $10^{18}$. The upper limit is governed by the need that the crystal retain its relevant properties.

In particular, in a system of the kind described, it is found that the reflectance coefficient (total incident light to total available light reflected) is comparatively high and for photon energies in the 5–6 electron volt range is approximately .30. Accordingly, for larger amounts of modulation with a given modulating voltage swing, it is feasible to subject the beam to mutliple reflections. For example, if the beam is subjected to two reflections, for reflectances of .3 there still remains 10 percent of the original beam intensity which in most instances should be more than adequate. Such multiple reflection can be easily effected as shown schematically in FIG. 3 by positioning a mirror 21 opposite the reflecting face of the crystal 14.

As previously indicated, the high index of reflection achieved appears to be dependent on the ferro-electric nature of the crystal used as the reflecting medium even though the crystal is operated at temperatures above those where it exhibits ferroelectric domains. Additionally, it is found important that the crystal also exhibit semiconducting properties in order that large electric field changes can be established in a layer corresponding to the region of reflection.

The requirements of semiconductivity and ferroelectricity are most readily achieved in the ferroelectric oxides of perovskite structure such as barium titanate, potassium tantalate, potassium niobate and solid solutions of potassium tantalate-potassium niobate, and these materials all are suited to the practice of the invention. Potassium tantalate has proved particularly useful because it has proven the easiest to cleave for achieving the desired specular reflecting surface. In particular, cleavage along the 100 plane in potassium tantalate provides a specular surface particularly advantageous.

However, the amount of modulation which can be attained at a particular wavelength is dependent on the nature of the reflecting medium, and accordingly at particular wavelengths materials other than potassium tantalate might prove more advantageous.

It is of course feasible to form the desired rectifying surface barrier where the reflection is to occur by means other than a liquid electrolyte.

In particular, in FIG. 2, the ferroelectric crystal 25 is provided at one face with an appropriate conductive film 26 which serves to form a large area rectifying barrier connection whereby a space charge layer contiguous to such face can be formed for use as the reflecting surface in the manner previously described. Naturally, the film 26 should be substantially transparent to the light being reflected. Additionally, electrode 27 is provided for forming a low resistance ohmic connection to the bulk of the crystal.

In the case where the crystal 25 is potassium tantalate the film 26 can be a sputtered gold film about 50 Angstroms thick. Copper and platinum are other metals which are suitable. Chromium is particularly advantageous for the ohmic connection 27 and aluminum and titanium are suitable alternatives.

It should be obvious at this point that the specific embodiments described are merely illustrative of the general principles of the invention, and that other embodiments can be devised by one skilled in the art without departing from the spirit and scope of the invention.

In particular, by a suitable arrangement, a light beam could be modulated at microwave frequencies in accordance with the invention. At microwave frequencies, it should be advantageous to avoid the use of a surface rectifying barrier and instead to rely on appropriate geometry and microwave circuitry to achieve a localized high electric field region in the sample. For example, the crystal could be of high resistivity material and shaped so that it is resonant essentially at the center of the band of modulation frequencies and then it could be incorporated in a microwave cavity resonant at this same frequency such that the surface, on which the light beam to be modulated is incident, is in a region of high electric microwave field. In particular, the cavity also could be designed to concentrate the electric field in such region. Again, provision of a D–C bias should be made to avoid the injection of free charge carriers in the sample.

What is claimed is:

1. Apparatus for modulating an optical beam comprising
   a ferroelectric semiconducting crystal whose characteristic energy gap is less than the photon energies of the beam to be modulated,
   means for forming a localized surface region of high electric field in the crystal,
   means for directing the optical beam to be modulated for incidence on said surface region without passage through the bulk of the crystal and reflection therefrom,
   means for varying in accordance with modulating information the electric field in said region, and
   means for utilizing the reflected beam.

2. Apparatus in accordance with claim 1 in which the crystal is taken from the group of ferroelectric semiconducting materials consisting of barium titanate, potassium tantalate, potassium niobate, and potassium tantalate-potassium niobate solid solutions.

3. Apparatus in accordance with claim 1 in which the crystal consists of barium titanate.

4. Apparatus in accordance with claim 1 in which the crystal consists of potassium tantalate.

5. Apparatus in accordance with claim 1 in which the crystal consists of potassium niobate.

6. Apparatus in accordance with claim 1 in which the crystal consists of potassium tantalate-potassium niobate.

7. Apparatus in accordance with claim 1 in combination with means for causing multiple reflections of the beam on said face of the crystal.

8. Apparatus in accordance with claim 1 in which the means for forming a region of high electric field in the crystal comprises means for forming a rectifying surface barrier connection to one face of the crystal and the beam to be modulated is made incident on said face.

9. Apparatus in accordance with claim 8 in which the crystal has one face in contact with an electrolyte which is transparent to the incident beam for forming the rectifying surface barrier at such face.

10. Apparatus in accordance with claim 8 in which a conductive layer transparent to the incident beam is deposited on said face for forming the rectifying surface barrier.

References Cited

UNITED STATES PATENTS

Re. 16,733   9/1927   Jenks _____ 350—160

OTHER REFERENCES

Richard Williams: Physical Review, Electric Field Induced Light Absorption in Cd. S., Mar. 15, 1960, p. 1487, Class 350, Subclass 160.

J. E. Gensic; Applied Physics Letters, Nonlinear Dielectric Properties of $KTaO_3$ Near Its Curie Point, May 15, 1963, p. 185, Class 331, Subclass 94.5.

M. G. Cohen; Applied Physics Letter, Electro-Optic KTN Gratings For Light Beam Modulation, Nov. 1, 1964, p. 181, Class 331—94.5.

ROBERT L. GRIFFIN, *Primary Examiner.*

A. MAYER, *Assistant Examiner.*

U.S. Cl. X.R.

350—160